(12) United States Patent
Agrawal (10) Patent No.: US 6,173,584 B1
(45) Date of Patent: Jan. 16, 2001

(54) MULTIEFFECT DISTILLATION

(75) Inventor: Rakesh Agrawal, Emmaus, PA (US)

(73) Assignee: Air Products and Chemicals, Inc., Allentown, PA (US)

( * ) Notice: Under 35 U.S.C. 154(b), the term of this patent shall be extended for 0 days.

(21) Appl. No.: 09/390,082

(22) Filed: Sep. 3, 1999

(51) Int. Cl.$^7$ ....................................................... F25J 3/00
(52) U.S. Cl. ............................................... 62/620; 62/643
(58) Field of Search ............................ 62/620, 643, 905, 62/926, 646

(56) References Cited

U.S. PATENT DOCUMENTS

| | | | |
|---|---|---|---|
| 5,245,832 | 9/1993 | Roberts | 62/24 |
| 5,505,052 | * 4/1996 | Ekins et al. | 62/643 |
| 5,755,115 | * 5/1998 | Manley | 62/620 |
| 5,761,927 | * 6/1998 | Agrawal et al. | 62/643 |
| 5,887,447 | * 3/1999 | Higginbotham | 62/643 |
| 5,970,742 | * 10/1999 | Agrawal et al. | 62/630 |

OTHER PUBLICATIONS

Tyreus, B.D. et al., "Two Towers Cheaper Than One?", Energy Management, *Hydrocarbon Processing*, Jul. 1975, pp. 93–96.

Wankat, Phillip C., "Multieffect Distillation Processes", *Ind. Eng. Chem. Res.* 1993, 32, 894–905.

Annakou, Omar et al., "Rigorous Comparative Study of Energy–Integrated Distillation Schemes", *Ind.Eng.Chem.Res.* 1996, 35, 1877–1885.

Fidowski, Zbigniew et al., "Minimum Energy Requirements of Thermally Coupled Distillation Systems", *AIChE Journal*, Apr. 1987, vol. 33, No. 4.

* cited by examiner

Primary Examiner—William Doerrler
(74) Attorney, Agent, or Firm—Willard Jones, II (57) ABSTRACT

A multieffect distillation process separates multicomponent mixtures containing three or more components into at least four product streams each enriched in one of the components. Thermally linked high pressure and low pressure columns are used in the process. The feed is fed to one of the two distillation columns and a product stream is produced from each end of this distillation column. A mixture stream also is produced from an intermediate location of this column and sent to the other distillation column. A product stream is produced from each end of the other distillation column.

39 Claims, 8 Drawing Sheets

MULTIEFFECT DISTILLATION

CROSS-REFERENCE TO RELATED APPLICATIONS

Not Applicable.

STATEMENT REGARDING FEDERALLY SPONSORED RESEARCH FOR DEVELOPMENT

Not Applicable.

BACKGROUND OF THE INVENTION

The present invention pertains to the field of distillation of fluid mixtures, and in particular to multieffect distillation processes to separate multicomponent mixtures containing three or more components into four product streams each enriched in one of the components.

Multieffect distillation has long been considered as one of the methods to reduce energy consumption in distillation columns. In a multieffect distillation, two heat integrated distillation columns are used. This heat integration is achieved by operating one column at a higher pressure than the other. Feed is fed to one of the distillation columns. The vapor from the top of the high pressure column is condensed by heat exchange with the liquid at the bottom of the low pressure column. Thus, the vapor in the high pressure column provides the boilup duty for the low pressure column.

There are several studies on the use of multieffect distillation for a binary feed distillation, the earliest being that of distilling air to produce nitrogen and oxygen. For this purpose, air is treated as a binary mixture and is fed to a high pressure column. The crude liquid oxygen from the bottom of the high pressure column is fed to an intermediate location of the low pressure column. The bottom of the low pressure column is boiled by condensing the nitrogen vapor from the top of the high pressure column. Both nitrogen and oxygen are produced from the low pressure column.

There are several more multieffect distillation processes for binary distillation. Details of these appear in a paper by Wankat ("Multieffect Distillation Processes", P. C. Wankat, Ind. Eng. Chem. Res., pages 894–905, volume 32, 1993). Tyreus and Luyben studied the multieffect distillation for propylene-propane and methanol-water separations ("Two Towers Cheaper Than One?", B. D. Tyreus and W. L. Luyben, Hydrocarbon Processing, pages 93–96, July 1975). They found that as compared to a conventional single distillation column, the multieffect distillation consisting of two distillation columns required about 46% less steam for propylene-propane separation and about 40% less steam for methanol-water separation.

Recently, multieffect distillation processes for the distillation of ternary feed mixtures have been explored. This is due to an attractive feature of multieffect distillation in reducing the boilup needs from an external heat source.

U.S. Pat. No. 5,245,832 (Roberts) discloses a multieffect distillation process consisting of three distillation columns to separate air into three product streams each enriched in oxygen, argon and nitrogen respectively. The use of three distillation columns and an associated increase in the number of reboilers and condensers make this process unattractive.

Annakou and Mizsey ("Rigorous Comparative Study of Energy-Integrated Distillation Processes", O. Annakou and P. Mizsey, Ind. Eng. Chem. Res., pages 1877–1885, Volume 35, 1996) have proposed four multieffect distillation processes each consisting of two distillation columns to distill a given ternary mixture. These four prior art processes are shown in FIGS. 1 through 4. In these processes, a ternary mixture having components A, B and C (mixture ABC) is separated into three product streams each enriched in one of the components. A is the most volatile component and C is the least volatile component.

Figure 1:
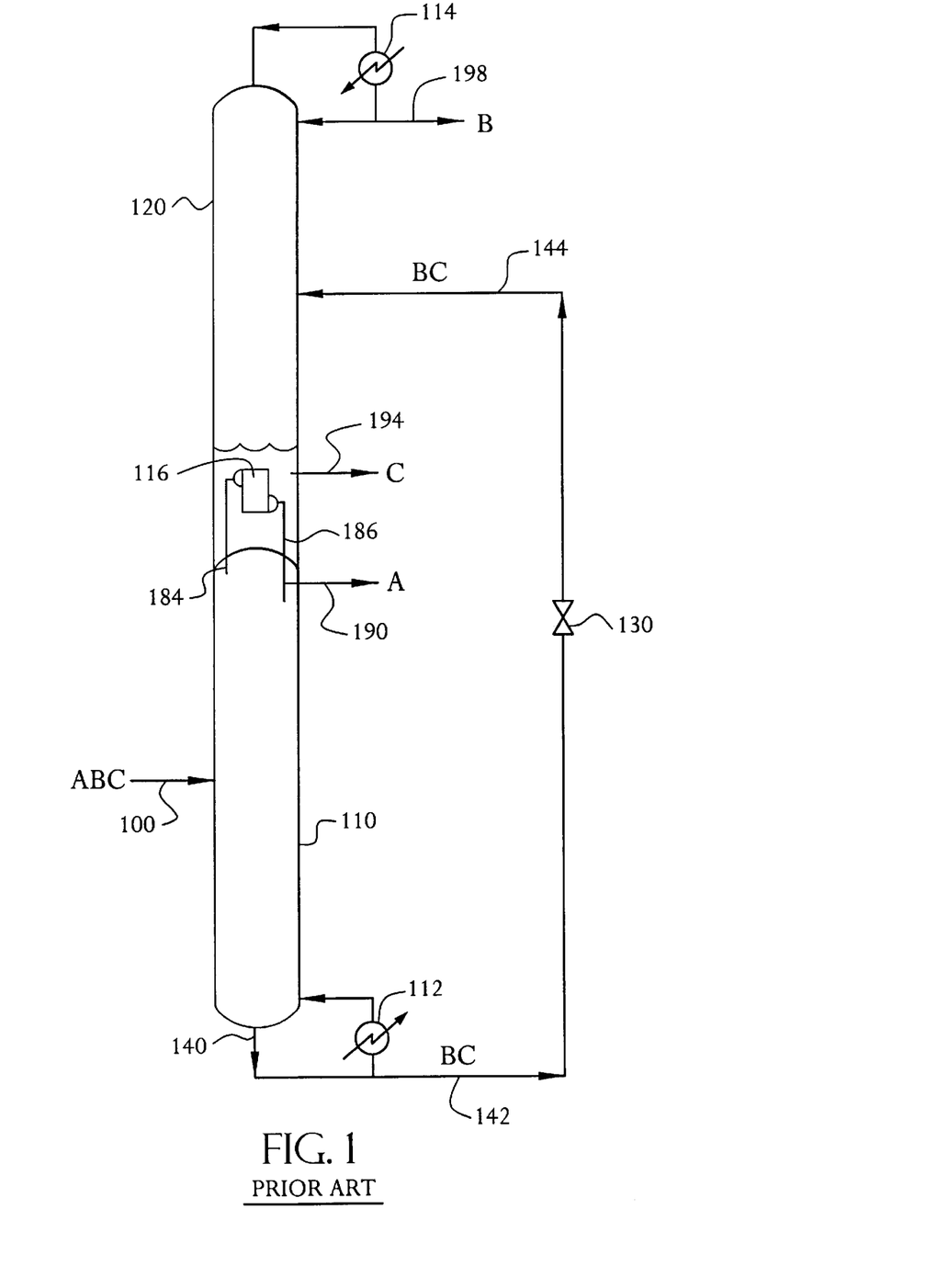
FIGS. 1 through 4 illustrate schematic diagrams of four prior art processes.

In the prior art process of FIG. 1, the ternary feed mixture 100 is fed to an intermediate location of the high pressure column 110. (A location of a distillation column is an "intermediate location" when there is at least one separation stage above and one separation stage below that location. A "separation stage" is a mass transfer contract device between liquid and vapor phases, such as a suitable mass transfer tray or a packed height of a suitable packing.) The vapor stream 184 enriched in component A from the top of the high pressure column is condensed in the reboiler/condenser 116. A portion of the condensed stream 186 provides the reflux for the high pressure column and the other portion provides the A-enriched product stream 190. From the bottom of the high pressure column, a portion of the A-lean binary stream that is enriched in components B and C (stream 140) is recovered as stream 142. The pressure of this stream is reduced across valve 130 and fed to the low pressure column 120. A product stream 198 enriched in component B is produced from the top of the low pressure column, and product stream 194 enriched in the heaviest component C is produced from the bottom of this column. The boilup at the bottom of the low pressure column is provided by vaporizing some bottom liquid in the reboiler/condenser 116. This reboiler/condenser provides thermal linking between the high pressure column and the low pressure column.

Figure 2:
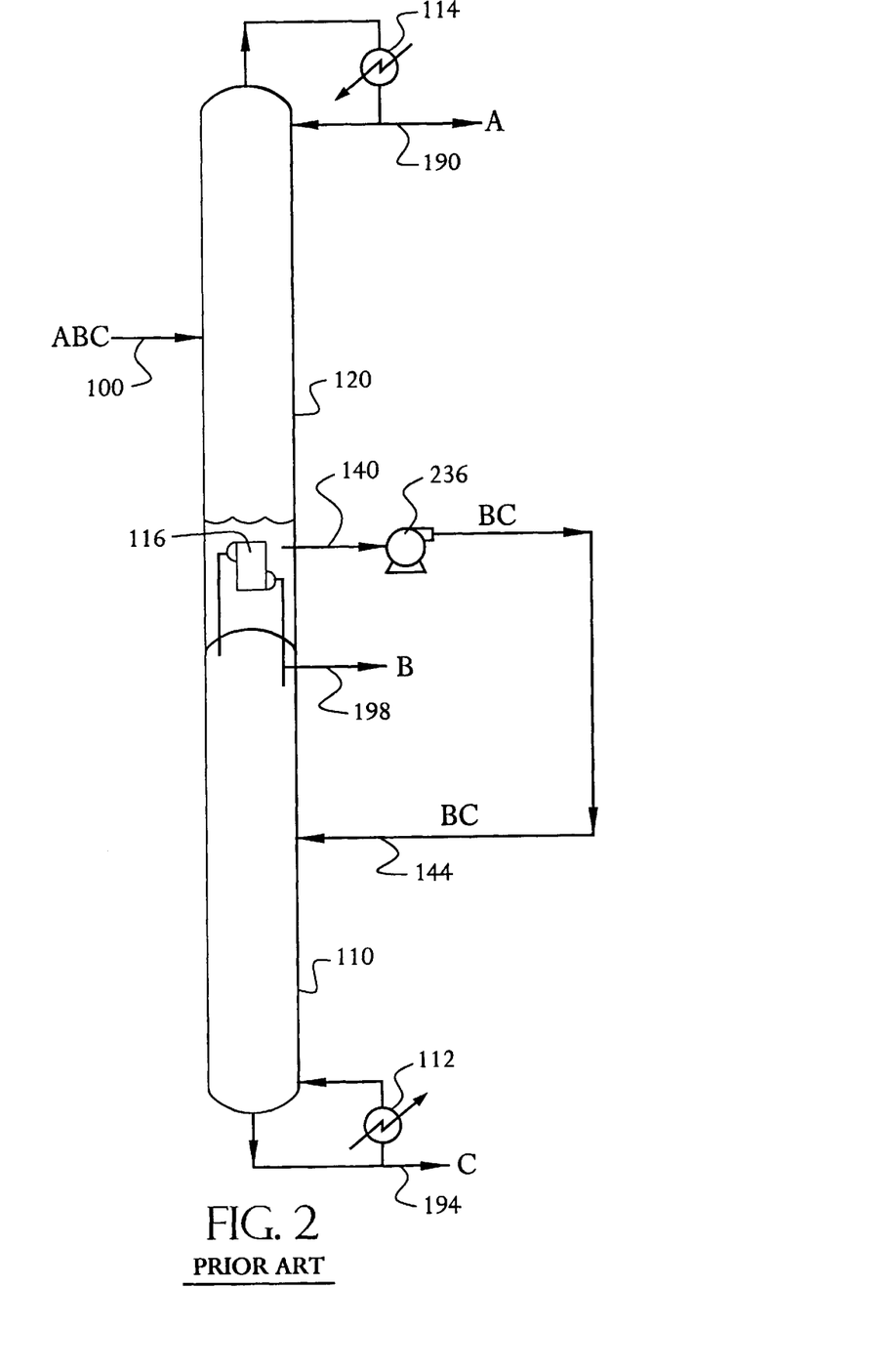

The prior art process in FIG. 2 is similar to the one in FIG. 1 in that it also uses a high pressure column 110 and a low pressure column 120 that are thermally linked through a reboiler/condenser 116. However, the feed stream 100 is now fed to an intermediate location of the low pressure column, and the product stream 190 enriched in the most volatile component A is recovered from the top of this column. The A-lean and essentially binary stream 140 containing components B and C is now collected from the bottom of the low pressure column and is increased in pressure across a pump 236 and then fed as stream 144 to the high pressure column 110. The high pressure column produces two product streams (198, 194) each enriched in components B and C respectively.

Figure 3:
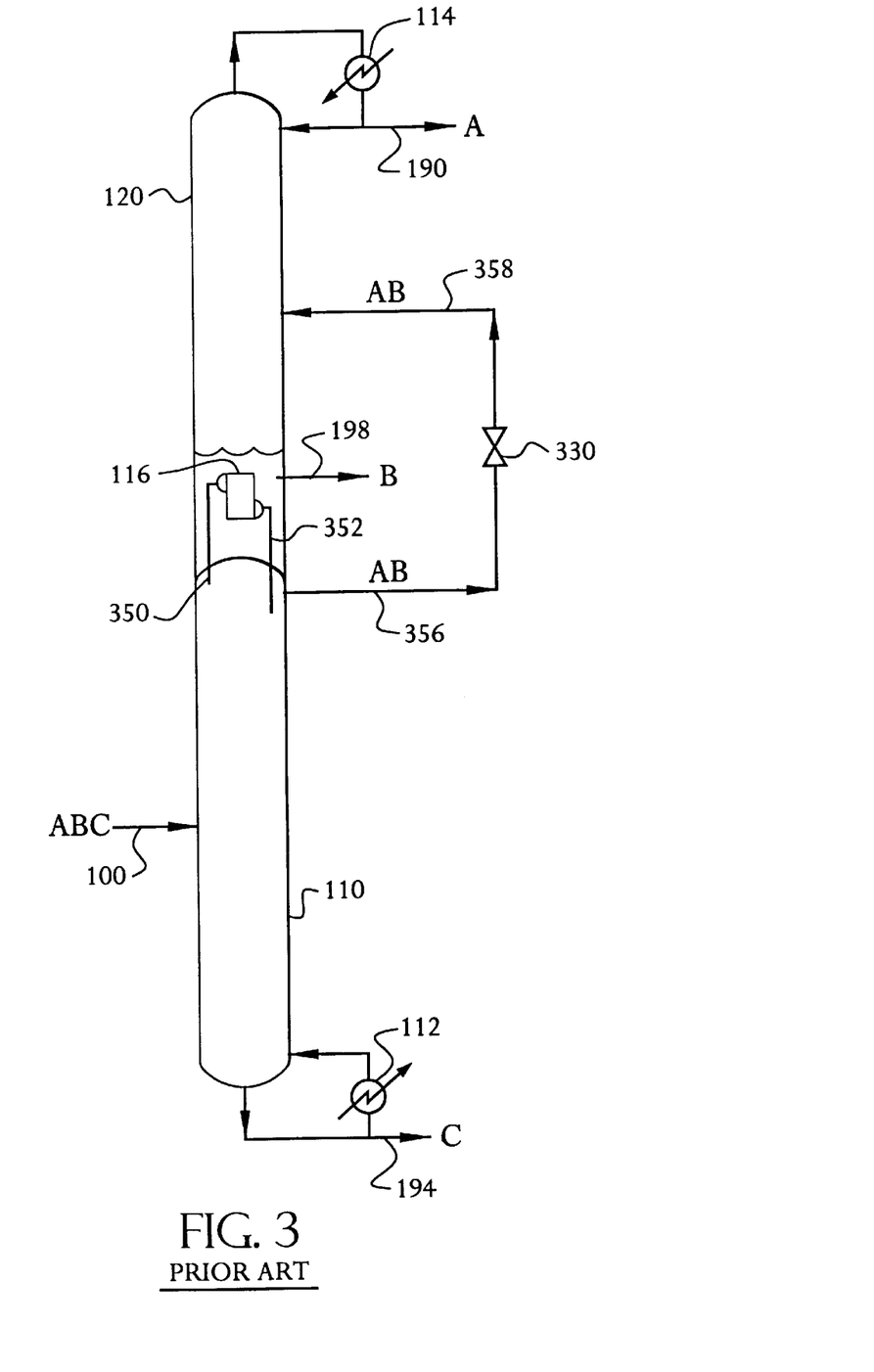

The prior art process of FIG. 3 is similar to the one in FIG. 1 in that it also uses a high pressure column 110 and a low pressure column 120 that are thermally linked through a reboiler/condenser 116. The feed stream 100 also is fed to an intermediate location of the high pressure column. However, rather than producing an A-enriched product stream from the top of the high pressure column, a product stream 194 enriched in the heaviest component C is produced from the bottom of this column. The vapor stream 350 at the top of the high pressure column is now lean in C but rich in both components A and B. After condensation, a portion of the condensed stream is withdrawn as stream 356, reduced in pressure across a valve 330 and fed to the low pressure column. The product streams (190, 198) enriched in components A and B are produced from the low pressure column.

Figure 4:
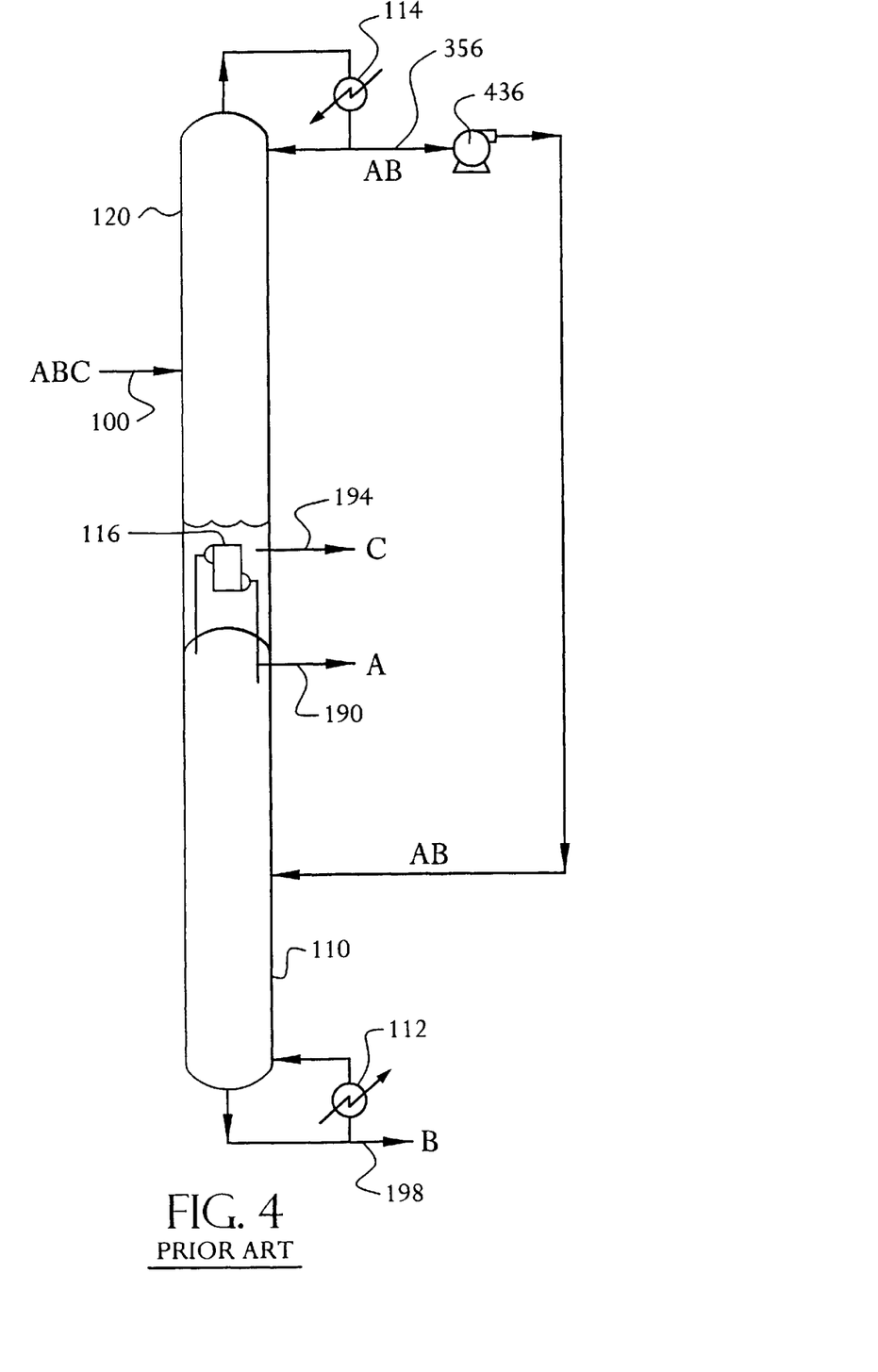

The prior art process of FIG. 4 also uses a high pressure column 110 and a thermally linked low pressure column 120. The feed mixture is fed to an intermediate location of the low pressure column. The C-enriched product stream 194 is recovered from the bottom of the low pressure column. A mixture lean in C but rich in A and B is recovered as stream 356 from the top of the low pressure column, pumped through pump 436 and fed to the high pressure column. The high pressure column produces the A-enriched and the B-enriched product streams (190, 198).

A common feature of all the prior art processes in FIGS. 1 through 4 is that the ternary feed mixture is fed to one of the two thermally linked columns. In the distillation column, the feed is distilled into a product stream at one end and an essentially binary mixture stream at the other end. The binary mixture is then fed to the other distillation column and a product stream is recovered from each end of this distillation column. In all, three product streams each enriched in one of the components is produced.

It is well known that among the conventional distillation column processes, a fully thermally coupled distillation system requires the lowest heat duty for a ternary distillation ("Minimum Energy Requirements of Thermally Coupled Distillation Systems", Z. Fidkowski and L. Królikowski, AIChE Journal, pages 643–653, Volume 33, 1987). However, Annakon and Mizsey found that the multieffect distillation column processes of FIGS. 1 through 4 generally required less heat duty than the fully thermally coupled distillation system. The ternary mixtures studied by them are: pentane-hexane-heptane; isopentane-pentane-hexane; and butane-isopentane-pentane. Furthermore, they found that in the cases of relatively pure products, the multieffect distillation process is always the most economical solution.

It is desired to have multieffect distillation processes with even lower heat demand than the prior art multieffect distillation processes for the distillation of a multicomponent feed mixture.

It is further desired to have multieffect distillation processes that are easy to operate while having low heat requirements.

It is still further desired to have multieffect distillation processes using only two distillation columns for the distillation of ternary mixtures.

It also is desired to have multieffect distillation processes which overcome the difficulties and disadvantages of the prior art to provide better and more advantageous results.

BRIEF SUMMARY OF THE INVENTION

The present invention is a multieffect distillation process which separates multicomponent mixtures containing three or more components into at least four product streams each enriched in one of the four components.

A first embodiment of the invention is a process for multieffect distillation of a multicomponent fluid containing at least three components, each component having a different volatility, into at least four product streams. The process uses a first distillation column operating at a first pressure and a second distillation column operating at a second pressure, wherein the first and second distillation columns are thermally linked. Each distillation column has a top, a bottom, and at least one separation stage. The process comprises multiple steps. The first step is to feed the multicomponent fluid into the first distillation column at a first intermediate location. The second step is to separate at least a portion of a first component from the other components of the multicomponent fluid in the first distillation column, thereby forming a mixture stream lean in the first component. The third step is to remove the portion of the first component from the first distillation column in a first product stream rich in the first component. The fourth step is to withdraw the mixture stream from the first distillation column. The fifth step is to feed the mixture stream into the second distillation column. The sixth step is to separate at least a portion of a second component and at least a portion of a third component from the mixture stream in the second distillation column. The seventh step is to remove the at least a portion of the second component from the second distillation column in a second product stream rich in the second component. The eighth step is to remove the at least a portion of the third component from the second distillation column in a third product stream rich in the third component. The ninth step is to remove a fourth product stream from the first distillation column.

The multicomponent fluid in the first step may be from the group consisting of nitrogen/oxygen/argon mixtures, benzene/toluene/xylene mixtures, nitrogen/carbon monoxide/methane mixtures, combinations of three or more components from C1 to C5 alcohols, and hydrocarbon mixtures, said hydrocarbon mixtures being selected from the group consisting of pentane-hexane-heptane, isopentane-pentane-hexane, butane-isopentane-pentane, iso-butane-n-butane-gasoline, and combinations of three or more components from C1 to C6 hydrocarbons or $C_4$ isomers.

In a second embodiment, which includes the same multiple steps as the first embodiment, the mixture stream is withdrawn from the first distillation column at a location which is below the first intermediate location and at least one separation stage above the bottom of the first distillation column.

In a third embodiment, the mixture stream is withdrawn from the first distillation column at a location which is above the first intermediate location and at least one separation stage below the top of the first distillation column.

In a fourth embodiment, the fourth product stream is rich in the component having a highest volatility of the at least three components and the fourth product stream is removed from the top of the first distillation column.

In a fifth embodiment, the fourth product stream is rich in a component having a lowest volatility of the at least three components and the fourth product stream is removed from the bottom of the first distillation column.

In a sixth embodiment, the first pressure is higher than the second pressure. This embodiment has the same multiple steps as the first embodiment.

A seventh embodiment has the same nine steps as the sixth embodiment, but includes the additional step of reducing the pressure of the mixture stream withdrawn from the first distillation column before the mixture stream is fed into the second distillation column. In one variation of this embodiment, the mixture stream is withdrawn from the first distillation column as a liquid. In another variation, the mixture stream is withdrawn from the first distillation column as a vapor.

In one variation of the sixth embodiment, the first and second distillation columns are thermally linked by condensing at least a portion of a vapor stream from the top of the first distillation column by heat exchange against at least a portion of a bottoms liquid from the bottom of the second distillation column.

In an eighth embodiment, which has the same multiple steps as the first embodiment, the first pressure is lower than the second pressure. In a variation of the eighth embodiment, the first and second distillation columns are thermally linked by condensing at least a portion of a vapor stream from the top of the second distillation column by heat exchange against at least a portion of a bottoms liquid from the bottom of the first distillation column.

A ninth embodiment has the same steps as the eighth embodiment, but includes the further step of increasing the pressure of the mixture stream withdrawn from the first distillation column before the mixture stream is fed into the second distillation column. In one variation of the ninth embodiment, the mixture stream is withdrawn from the first distillation column as a liquid. In another variation of the ninth embodiment, the mixture stream is withdrawn from the first distillation column as a vapor.

Another aspect of the present invention is a cryogenic air separation unit using a process such as that in the first embodiment.

A tenth embodiment of the invention comprises seven steps. The first step is to feed the multicomponent fluid into the first distillation column at a first intermediate location. The second step is to withdraw from the top of the first distillation column a first product stream rich in a component having a highest volatility of the at least three components. A third step is to withdraw from the bottom of the first distillation column a second product stream rich in a component having a lowest volatility of the at least three components. A fourth step is to withdraw from the first distillation column a mixture stream rich in at least one of the at least three components having an intermediate volatility and being lean in another component having a highest or lowest volatility of the at least three components. A fifth step is to feed the mixture stream to the second distillation column. A sixth step is to withdraw from the top of the second distillation column a third product stream rich in one of the at least three components. The seventh step is to withdraw from the bottom of the second distillation column a fourth product stream rich in another of the at least three components.

As with the first embodiment, the multicomponent fluid in the tenth embodiment may be selected from the group consisting of nitrogen/oxygen/argon mixtures, benzene/toluene/xylene mixtures, nitrogen/carbon monoxide/methane mixtures, combinations of three or more components from C1 to C5 alcohols, and hydrocarbon mixtures, said hydrocarbon mixtures being selected from the group consisting of pentane-hexane-heptane, isopentane-pentane-hexane, butane-isopentane-pentane, iso-butane-n-butane-gasoline, and combinations of three or more components from C1 to C6 hydrocarbons or $C_4$ isomers.

In a variation of the tenth embodiment, the first and second distillation columns are thermally linked by condensing at least a portion of a vapor stream from the top of the first distillation column by heat exchange against at least a portion of a bottoms liquid from the bottom of the second distillation column.

In an eleventh embodiment, which includes the same multiple steps as the tenth embodiment, the mixture stream is withdrawn from the first distillation column at a location below the first intermediate location and at least one separation stage above the bottom of the first distillation column.

In a twelfth embodiment, the mixture stream is withdrawn from the first distillation column at a location above the first intermediate location and at least one separation stage below the top of the first distillation column.

In addition to the seven steps of the tenth embodiment, a thirteenth embodiment includes the further step of reducing the pressure of the mixture stream withdrawn from the first distillation column before the mixture stream is fed to the second distillation column. In one variation of the thirteenth embodiment, the mixture stream is withdrawn from the first distillation column as a liquid. In a variation of that variation, a product stream rich in one of the components having an intermediate volatility is withdrawn from the top of the second distillation column and a product stream rich in a component having a lowest volatility is withdrawn from bottom of the second distillation column.

In another variation of the thirteenth embodiment, the mixture stream is withdrawn from the first distillation column as a vapor.

In a fourteenth embodiment, which has the same steps as the tenth embodiment, a mixture stream lean in a component having a lowest volatility is withdrawn from a location above the first intermediate location and at least one separation stage below the top of the first distillation column.

In addition the seven steps of the tenth embodiment, a fifteenth embodiment includes the further step of increasing the pressure of the mixture stream withdrawn from the first distillation column before the mixture stream is fed to the second distillation column. In a variation of the fifteenth embodiment, the mixture stream is withdrawn from the first distillation column as vapor. In another variation of the fifteenth embodiment, the mixture stream is withdrawn from the first distillation column as liquid. In a variation of the latter variation, a product stream rich in a component having an intermediate volatility is collected from the bottom of the second distillation column and a product stream rich in a component having a highest volatility is withdrawn from the second distillation column.

In a sixteenth embodiment, which has the same steps as the tenth embodiment, a mixture stream lean in a component having a highest volatility is withdrawn from the first distillation column at a location below the first intermediate location and at least one separation stage above the bottom of the first distillation column.

In addition to the steps of the sixteenth embodiment, a seventeenth embodiment includes the further step of increasing the pressure of the mixture stream withdrawn from the first distillation column before the mixture stream is fed to the first distillation column. In one variation of the seventeenth embodiment, the mixture stream is withdrawn from the first distillation column as a vapor. In another variation, the mixture stream is withdrawn from the first distillation column as a liquid. In a variation of the latter variation, a product stream rich in a component having an intermediate volatility is withdrawn from the top of the second distillation column and a product stream rich in a component having the lowest volatility is withdrawn from the bottom of the second distillation column.

Finally, another aspect of the present invention is a cryogenic air separation unit using a process as in the tenth embodiment.

BRIEF DESCRIPTION OF THE DRAWINGS

The invention will be described by way of example with reference to the accompanying drawings in which.

DETAILED DESCRIPTION OF THE INVENTION

The current invention provides more efficient multieffect distillation processes. It is a process for the distillation of a multicomponent stream containing three or more components into at least four product streams by using two thermally linked distillation columns, wherein one of the distillation columns operates at a high pressure and the other distillation column operates at a lower pressure, and thermal linking is achieved by condensing a vapor stream from the high pressure column by heat exchange against a liquid stream in the low pressure column to provide some boilup to the low pressure column. The process comprises the following steps:

i) the feed is fed to the first distillation column and a product stream enriched in the most volatile component is produced from the top of this distillation column and a product stream enriched in the least volatile component is produced from the bottom of the distillation column;

ii) a mixture stream lean in either the most or the least volatile component is withdrawn from the first distillation column and fed to the second distillation column; and iii) a product stream rich in one of the components is produced from the top of the second distillation column and another product stream rich in another component is produced from the bottom of the second distillation column.

Generally the thermal linking is achieved by condensing the vapor from the top of the high pressure column against the liquid from the bottom of the low pressure column. This provides the vapor boilup for the low pressure column. However, in certain applications, the vapor from the top of the high pressure column could provide a boilup at an intermediate location of the low pressure column. Alternatively, the vapor from an intermediate location of the high pressure column could be condensed against the liquid at the bottom of the low pressure column. In other words, a vapor stream could be withdrawn from a suitable location of the high pressure column and condensed by heat exchange against the liquid from a suitable location of the low pressure column.

If needed, some additional boilup duty to the low pressure column can be provided by using a heat source besides the condensation of a vapor stream from the high pressure column. Similarly some additional condensing duty to the high pressure column can be provided by using a cooling source besides the vaporization of the liquid from the low pressure column.

The first distillation column receiving the feed can be either the high pressure column or the low pressure column. When the first distillation column is the high pressure column, the mixture stream in step (ii) is let down in pressure and fed to the low pressure column. Generally, the pressure can be let down across a valve or an expander generating work. In cases where the first distillation column is the low pressure column, the mixture stream in step (ii) is increased in pressure and fed to the high pressure column. The increase in pressure is achieved either by the use of a pump or a compressor or by gravitational head.

Generally the mixture stream in step (ii) is taken out as a liquid stream from the first distillation column and the withdrawal location is at an intermediate location of this distillation column. Sometimes this mixture stream could be taken out either as a vapor or a two-phase stream. In some cases, the enthalpy of this mixture stream after the withdrawal from the first distillation column could be changed by a suitable heat exchange prior to feeding it to the second distillation column. Generally, this mixture stream is fed to an intermediate location of the second distillation column. However, if needed, it could be fed to the top of the distillation column when the second distillation column is the low pressure column; and to the bottom of the distillation column when the second distillation column is the high pressure column.

Any product stream could be produced as a liquid or a vapor or a two-phase stream. It also is possible to produce multiple product streams in different thermodynamic states from any one end of a distillation column. If needed, a product stream could be produced from an intermediate location of a distillation column. Prior to the introduction of the feed to the first distillation column, its enthalpy could be adjusted by a suitable heat exchange. In some instances, more than one feed stream could be fed to the first distillation column. These feed streams could be of the same composition but of different specific enthalpies. It also is possible for these feed streams to have different compositions.

The invention will now be described in more detail with reference to the processes shown in FIGS. 5 through 8.

Consider the separation of a ternary mixture containing three constituent components A, B and C. Sometimes, besides these three major constituent components, other components also may be present in small amounts in the feed mixture. Of the three major components, A is the most volatile and C is the least volatile. The objective is to separate the ternary feed mixture into four product streams each enriched in one of the three major components.

Figure 5:
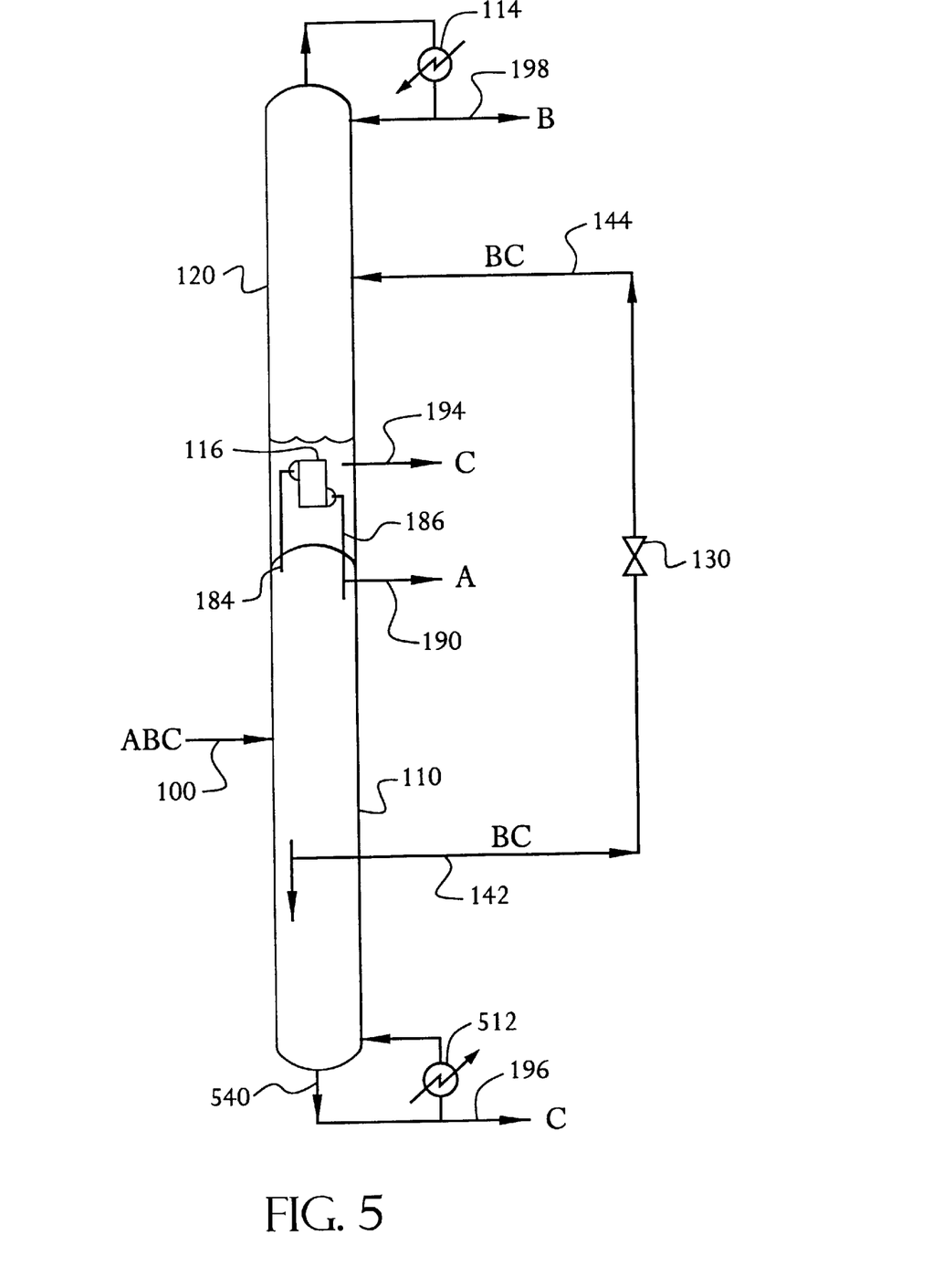
FIG. 5 is a schematic diagram of an embodiment of the present invention.

FIG. 5 shows a process according to the current invention where the first distillation column is a high pressure column 110 and the second distillation column is a low pressure column 120. The feed mixture ABC (stream 100) is fed to an intermediate location of the high pressure column 110. The vapor stream 184 from the top of the high pressure column is enriched in the most volatile major component A. At least a portion of this vapor stream is condensed in reboiler/condenser 116. A portion of this condensed stream 186 is recovered as a product stream 190 enriched in component A and the other portion is sent as liquid reflux to the high pressure column. Alternatively, a portion of the vapor stream 184 also could be recovered as a product stream enriched in component A.

The boilup at the bottom of the high pressure column 110 is provided through reboiler 512. A portion of the bottom liquid 540 is recovered as a product stream 196 enriched in the least volatile major component C. Alternatively, a portion of the vapor stream exiting reboiler 512 also could be recovered as a product stream enriched in component C.

According to step (ii) of the invention, a liquid mixture stream 142 lean in the most volatile major component A but containing both components B and C is withdrawn from a location below the feed location but at least one separation stage above the bottom of the high pressure column 110. The pressure of this liquid mixture is reduced across valve 130 and is fed to the low pressure column 120 as stream 144. In FIG. 5, this stream 144 is fed at an intermediate location. The boilup to the low pressure column is provided through thermal linking through reboiler/condenser 116 where at least a portion of the bottom liquid is vaporized by heat exchange. According to step (iii) of the invention, a product stream 198 rich in the component of intermediate volatility B is produced from the top of the low pressure column and a product stream 194 rich in the least volatile component C is produced from the bottom of this distillation column. The condensing duty and the liquid reflux for the low pressure column is provided through condenser 114.

In the process of FIG. 5, there are two product streams 194 and 196 that are rich in the least volatile major component C. The composition of these two streams may or may not be the same. Furthermore, these two streams could be combined to form one product stream.

In certain applications, when the product stream 198 rich in B is not needed to be of very high purity, the stream 144 could be fed to the top of the low pressure column 120. In such a case there may not be a need for condenser 114.

Figure 6:
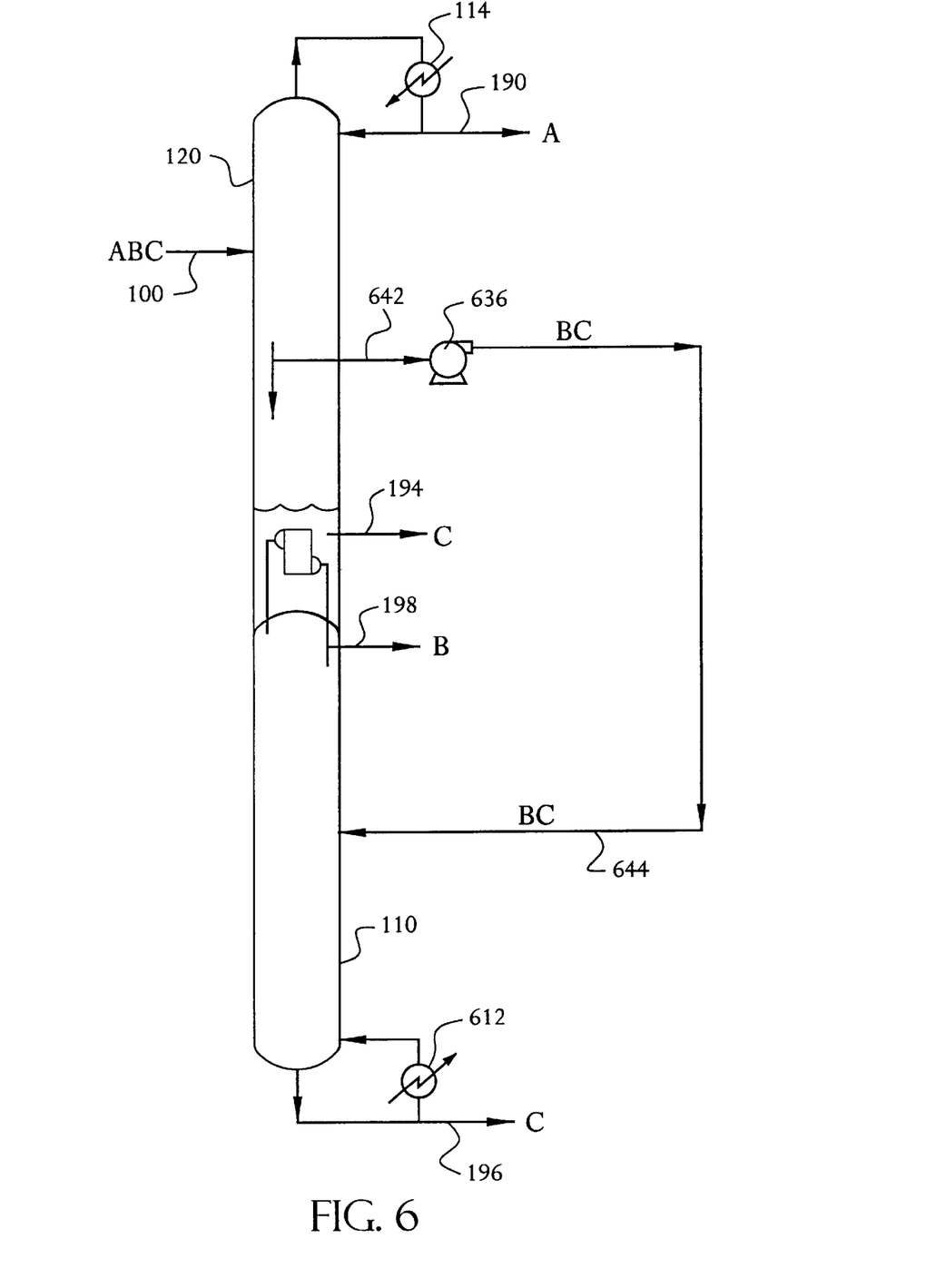
FIG. 6 is a schematic diagram of a second embodiment of the present invention.

FIG. 6 shows another process according to the current invention where the first distillation column is the low pressure column 120 and the second distillation column is the high pressure column 110. Now the feed 100 is fed to an intermediate location of the low pressure column. A product stream 190 enriched in the most volatile major component A is produced from the top of the low pressure column. A product stream 194 enriched in the least volatile major component C is produced from the bottom of the low pressure column. A liquid mixture stream 642 lean in the most volatile major component A but containing components B and C is withdrawn from a location below the feed but at least one separation stage above the bottom of the low pressure column. This liquid stream is then pumped through pump 636 and fed as stream 644 to the high pressure column 110. A product stream 198 rich in major component B of intermediate volatility is produced from the top of the high pressure column and a product stream rich in the least volatile major component C is collected from the bottom of this column. Again, the composition of product streams 194 and 196 each rich in the least volatile major component C may or may not be the same. If needed, both of these streams could be mixed to provide one product stream.

In the process of FIG. 6, the mixture 644 lean in the most volatile major component A is fed at an intermediate location of the high pressure column 110 to produce relatively pure C-rich stream 196. In certain applications, the product stream 196 may not be desired to be of high purity in C. For such cases, no separation stages may be used below the feed stream 644 to the high pressure column. Now the liquid from the bottom of the high pressure column will be sent to a partial reboiler 612, i.e., the exiting phase of the stream from the reboiler will be two-phase and while the vapor would be sent as boilup to the bottom of the high pressure column the liquid would be collected as product stream 196.

Figure 7:
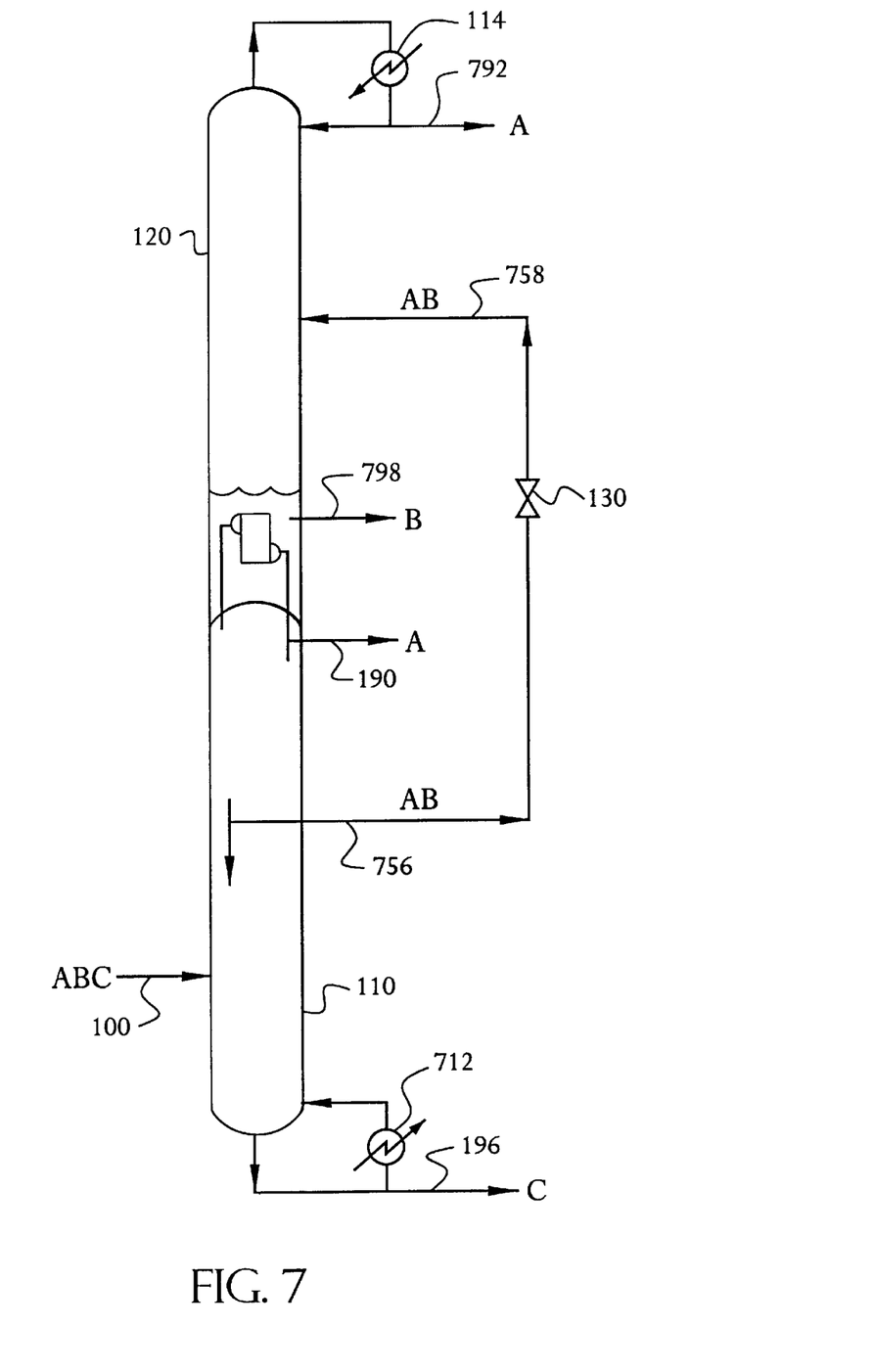
FIG. 7 is a schematic diagram of a third embodiment of the present invention.
Figure 8:
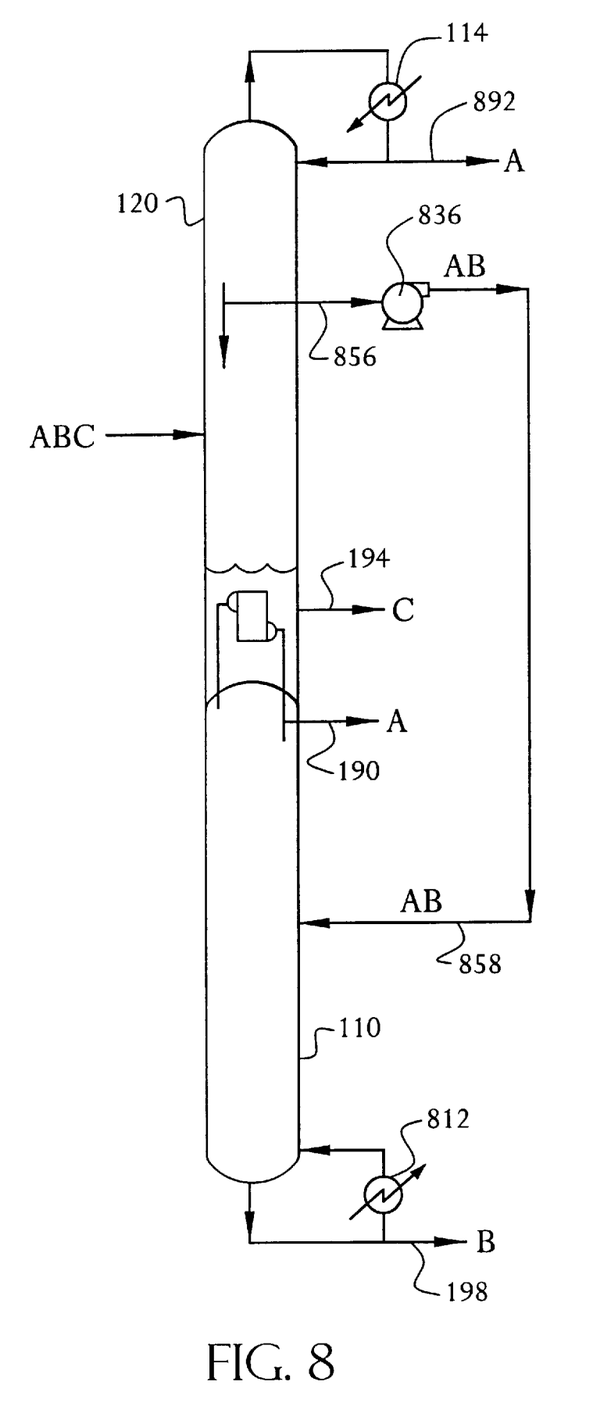
FIG. 8 is a schematic diagram of a fourth embodiment of the present invention.

In the processes of FIGS. 5 and 6, the feed to the first distillation column is distilled such that the mixture stream transferred from the first distillation column to the second distillation column is lean in the most volatile major component A. It also is possible to design processes where such a mixture stream is lean in the least volatile major component C. This is achieved by withdrawing the mixture stream from the first distillation column at a location that is above the feed point to the distillation column. FIGS. 7 and 8 show examples of two such processes.

The process in FIG. 7 is similar to the one in FIG. 5 with the major difference that now mixture stream 756 is withdrawn from a location that is above the feed stream 100 but at least one separation stage below the top of the high pressure column 110. This makes liquid stream 756 lean in the least volatile major component C. This liquid stream is then fed to the low pressure column 120 after some pressure reduction across valve 130. Unlike the process of FIG. 5, now the product stream 792 from the top of the low pressure column is rich in the most volatile major component A and the product stream 798 from the bottom of the low pressure column is rich in the component of intermediate volatility B. Now there are two product streams 190 and 792 that are rich in the most volatile major component A. The composition of both of these streams may or may not be the same. If needed, both of these streams could be mixed to provide one product stream. As in FIG. 5, the separation stages above the mixture stream 758 feed to the low pressure column are optional.

The process in FIG. 8 is similar to the one in FIG. 7 with the major difference that the first distillation column is now the low pressure column 120 and the feed is therefore fed to the low pressure column. The mixture stream 856 is withdrawn from a location above the feed but at least one separation stage below the top from the low pressure column and after pumping through pump 836 is fed to the high pressure column. From the bottom of the high pressure column 110 a product stream rich in the major component of intermediate volatility B is recovered, and from the top of the low pressure column 120 a product stream 892 rich in the most volatile major component A is withdrawn. Similar to the process of FIG. 6, separation stages below the mixture stream feed point to the high pressure column may not be used in certain applications.

It is worth noting that in all the processes of FIGS. 5 through 8, the first distillation column produces a product stream enriched in the most volatile major component A from the top and a product stream enriched in the least volatile major component C from the bottom. In all these processes, the second distillation column produces a product stream rich in the major component of intermediate volatility B from one of the ends of this distillation column. However, while the processes in FIGS. 5 and 6 recover a second product stream rich in the least volatile major component C from the bottom of the second distillation column, the processes in FIGS. 7 and 8 recover a second product stream rich in the most volatile major component A from the top of the second distillation column.

In the processes of FIGS. 5 through 8, the mixture stream according to step (ii) is shown to be withdrawn as a liquid stream from the first distillation column. However, either in addition or in lieu of this liquid mixture stream, a vapor mixture may be withdrawn from the first distillation column and fed to the second distillation column. Thus in FIG. 5, the mixture stream 142 may be a vapor stream which, after a drop in pressure either across a valve 133 or a turbo expander, is fed to the low pressure column 120. In another alternative, the original liquid mixture stream 142 may be retained and another vapor stream is withdrawn from the high pressure column 110 below the feed location and, after a drop in pressure, is fed to a suitable location of the low pressure column.

Another feature of the current invention is that additional reboilers and condensers may be used to make multieffect distillation processes more efficient. For example, rather than condensing all the vapor from the high pressure column in a reboiler/condenser that thermally links the high pressure and the low pressure columns, a portion of this vapor may be condensed in a separate condenser using another cooling source. The portion of this vapor for condensation may be drawn from any location above the feed to the high pressure column. After this condensation, a portion of the condensed liquid may be returned as reflux to the high pressure column.

Thus, in FIG. 5, a portion of the vapor stream 184 can be condensed by heat exchange against a fluid stream other than the liquid from the bottom of the low pressure column 120, and either the condensed liquid is collected as a product stream 190 or returned to the high pressure column 110 as reflux. Similarly, some additional boilup in the bottom section of the low pressure column can be provided by using a heat source other than the condensation of a vapor stream from the high pressure column. For example, in FIG. 5, a portion of the liquid in the low pressure column below the feed stream 144 may be withdrawn and at least partially vaporized using another heat source. The vaporized stream can be returned to the low pressure column to provide the boilup need of this column. In one option, a portion of the liquid at the bottom of the low pressure column can be vaporized using an alternate heat source and the vapor is returned to the bottom of the low pressure column.

When according to step (ii) of the invention, the mixture stream is transferred from the first distillation column to the second distillation column, it is possible to change its enthalpy between such a transfer. For example, in the process of FIG. 5, the enthalpy of liquid mixture BC in stream 142 may be adjusted after it is withdrawn from distillation column 110. Therefore, this stream could be heated in an heat exchanger to a two-phase stream or an all vapor stream and then fed to distillation column 120. In another alternative, stream 142 could be split into two streams and enthalpy of only one or both the streams is adjusted and both the streams are fed at appropriate locations of distillation column 120. Thus, while a first portion of stream 142 would be fed as shown in FIG. 5, the second portion could be heated to a two-phase or an all vapor stream and fed to a location that is a couple of stages below the feed location of the first portion. It also is possible to heat both the first and second portions to different degrees such that their specific enthalpies are not the same and then feed them at different locations of distillation column 120. While these examples are given with enthalpy adjustment by heating, it does not preclude enthalpy adjustment by subcooling either a portion or all of the liquid mixture BC in stream 142. Enthalpy adjustments also can be done for the liquid mixture BC in line 642 of FIG. 6 and liquid mixtures AB in lines 756 and 856 of FIGS. 7 and 8 respectively. Similarly, if a vapor stream was to be transferred between the columns, then its enthalpy also could be adjusted.

In the process of the current invention, a condenser 114 is shown at the top of the low pressure column 120. It is possible that this condenser may not be used and liquid reflux stream for the low pressure column may be obtained from another source in a plant where the process of the current invention is utilized. Similarly, a reboiler (512, 612, 712, 812) is shown at the bottom of the high pressure column 110. It is possible that this reboiler may not be used and the vapor boilup for the high pressure column may be provided from another source in a plant where the process of the current invention is utilized. Also, heat pumping may be used between any reboiler and condenser.

If needed, the mixture stream in step (ii) when withdrawn as liquid from the first distillation column may be sent first to a storage vessel and then from the storage vessel to another distillation column. The accumulated volume in the storage vessel can dampen out any fluctuations and may make it easier to control the operation of the distillation columns.

It is clear that the two column multieffect distillation processes described in FIGS. 5 through 8 can be used for feed mixtures containing more than three components. For example, consider the separation of a feed mixture containing four components A'B'C'D'. In this mixture, A' is the most volatile and D' is the least volatile and B' is more volatile than C'. When this four-component mixture is fed to any of the processes in FIGS. 5 through 8, a large number of separation possibilities exist. For example, if the feed is sent to the high pressure column 110 of FIG. 5, then the feed mixture A'B'C'D' could be split in more than one way. In one possibility, A'-rich stream could be collected as stream 190 from the top of the high pressure column, stream 196 could be D'-rich and stream 142 would contain B', C', and D'. From the low pressure column 120, stream 198 could be rich in B' or B'C' and stream 194 could be rich in (C'D') or D'. On the other hand, stream 190 from the top of the high pressure column may contain A'B', stream 196 from the bottom may be enriched in D', and mixture stream 142 would contain C'D'.

A number of other possibilities exist when the feed is sent to the high pressure column 110 of FIG. 7. The top product stream 190 could be enriched in A' and the bottom product stream 196 could be enriched in D'; and liquid mixture stream 756 will contain A', B' and C'. From the low pressure column 120 one could produce a stream rich in either A' or both A' and B' from the top and a product stream either rich in (B' and C') or C' from the bottom. Alternatively the product stream from the bottom of the high pressure column could be enriched in C' and D', and the liquid mixture stream 756 will contain predominately A' and B'. In summary, there are many such possibilities and the examples cited here are not meant to be exhaustive.

In all of the flow sheets of FIGS. 5 through 8, some of the streams are designated alphabetical names. This shows the particular component(s) in which that stream is enriched, and does not necessarily mean an absence of other components. Thus, a stream with letter A indicates a product stream enriched in component A, and it could be pure product stream or a stream contaminated with significant quantities of other components. Similarly, a stream with designation AB means that the stream is enriched in components of A and B, and it either contains only components A and B or could contain smaller quantities of other heavier components, such as C.

The present invention is applicable to the separation by distillation of any suitable feed mixture containing three or more components. Some examples of feed streams for which the present invention is applicable include nitrogen/oxygen/argon mixtures, benzene/toluene/xylene mixtures, nitrogen/carbon monoxide/methane mixtures, any combination of three or more components from C1 to C5 alcohols, any combination of three or more components from C1 to C6 hydrocarbons, or $C_4$ isomers. Some examples of hydrocarbon mixtures are: pentane-hexane-heptane; isopentane-pentane-hexane; butane-isopentane-pentane; and isobutane-n-butane-gasoline.

Among the conventional prior art processes for ternary distillation, it is well known that the fully thermally coupled distillation process requires the least total heat duty. Recently it has been shown that the multieffect distillation processes of FIGS. 1 through 4 often require even less heat duty than the fully thermally coupled distillation process. The multieffect distillation processes according to the current invention illustrated in FIGS. 5 through 8 will generally require even lower heat duty than the prior art multieffect distillation processes. Moreover, if an additional condenser is used at the top of the high pressure column using another condensing source and/or a reboiler at the bottom of the low pressure column using another heat source, one would get thermodynamically a more efficient process. The reason for the improvement resides in the fact that the feed mixture is distilled in the first distillation column to produce two product streams rather than one product stream as in the prior art processes of FIGS. 1 through 4. By producing a second product stream from the first distillation column, the recovery of this product stream from the second distillation column is decreased. This can reduce the vapor flow requirement in either one or both the distillation columns and hence the decrease in heat duty.

For example, if FIGS. 1 and 5 are compared, one finds that the extra production of a C-enriched product stream 196 from the high pressure column 110 in FIG. 5 decreases the production of C-rich stream 194 from the low pressure column 120. This can lead to substantial reduction in the vapor flow from the high pressure column. When the vapor through the high pressure column is not substantially reduced, but that of the low pressure column is substantially reduced, then some vapor from the top of the high pressure column can be condensed in an auxiliary condenser using an alternate cooling source. The heat in the auxiliary condenser is rejected at a higher temperature than the heat in the condenser 114 at the top of the low pressure column 120. This will make the process thermodynamically more efficient.

Also, when the number of components in the feed are greater than three, the recovery of an extra product stream from the first distillation column provides an extra degree of freedom to adjust the composition of the mixture stream drawn in step (ii) of the invention. This allows a great deal of flexibility in the composition of product streams that can be obtained from the second distillation column. This makes the processes of the current invention quite attractive for such distillations.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. A process for multieffect distillation of a multicomponent fluid containing at least three components, each component having a different volatility, into at least four product streams, said process using a first distillation column operating at a first pressure and a second distillation column operating at a second pressure, wherein the first and second distillation columns are thermally linked and each distillation column has a top, a bottom, and at least one separation stage, comprising the steps of:

feeding the multicomponent fluid into the first distillation column at a first intermediate location;

separating at least a portion of a first component from the other components of the multicomponent fluid in the first distillation column, thereby forming a mixture stream lean in the first component;

removing the portion of the first component from the first distillation column in a first product stream rich in the first component;

withdrawing the mixture stream from the first distillation column;

feeding the mixture stream into the second distillation column;

separating at least a portion of a second component and at least a portion of a third component from the mixture stream in the second distillation column;

removing the at least a portion of the second component from the second distillation column in a second product stream rich in the second component;

removing the at least a portion of the third component from the second distillation column in a third product stream rich in the third component; and removing a fourth product stream from the first distillation column.

2. A process as in claim 1 wherein the mixture stream is withdrawn from the first distillation column at a location which is below the first intermediate location and at least one separation stage above the bottom of the first distillation column.

3. A process as in claim 1 wherein the mixture stream is withdrawn from the first distillation column at a location which is above the first intermediate location and at least one separation stage below the top of the first distillation column.

4. A process as in claim 1 wherein the fourth product stream is rich in the component having a highest volatility of the at least three components and the fourth product stream is removed from the top of the first distillation column.

5. A process as in claim 1 wherein the fourth product stream is rich in a component having a lowest volatility of the at least three components and the fourth product stream is removed from the bottom of the first distillation column.

6. A process as in claim 1 wherein the first pressure is higher than the second pressure.

7. A process as in claim 6 comprising the further step of reducing the pressure of the mixture stream withdrawn from the first distillation column before the mixture stream is fed into the second distillation column.

8. A process as in claim 7 wherein the mixture stream is withdrawn from the first distillation column as a liquid.

9. A process as in claim 7 wherein the mixture stream is withdrawn from the first distillation column as a vapor.

10. A process as in claim 1 wherein the first pressure is lower than the second pressure.

11. A process as in claim 10 comprising the further step of increasing the pressure of the mixture stream withdrawn from the first distillation column before the mixture stream is fed into the second distillation column.

12. A process as in claim 11 wherein the mixture stream is withdrawn from the first distillation column as a liquid.

13. A process as in claim 11 wherein the mixture stream is withdrawn from the first distillation column as a vapor.

14. A process as in claim 6 wherein the first and second distillation columns are thermally linked by condensing at least a portion of a vapor stream from the top of the first distillation column by heat exchange against at least a portion of a bottoms liquid from the bottom of the second distillation column.

15. A process as in claim 10 wherein the first and second distillation columns are thermally linked by condensing at least a portion of a vapor stream from the top of the second distillation column by heat exchange against at least a portion of a bottoms liquid from the bottom of the first distillation column.

16. A cryogenic air separation unit using a process as in claim 1.

17. A process as in claim 1 wherein the multicomponent fluid is selected from the group consisting of nitrogen/oxygen/argon mixtures, benzene/toluene/xylene mixtures, nitrogen/carbon monoxide/methane mixtures, combinations of three or more components from C1 to C5 alcohols, and hydrocarbon mixtures, said hydrocarbon mixtures being selected from the group consisting of pentane-hexane-heptane, isopentane-pentane-hexane, butane-isopentane-pentane, iso-butane-n-butane-gasoline, and combinations of three or more components from C1 to C6 hydrocarbons or $C_4$ isomers.

18. A process for the multieffect distillation of a multicomponent fluid containing at least three components, each component having a different volatility, into at least four product streams, said process using a first distillation column operating at a first pressure and a second distillation column operating at a second pressure, wherein the first and second distillation columns are thermally linked and each distillation column has a top, a bottom, and at least one separation stage, comprising the steps of:

feeding the multicomponent fluid into the first distillation column at a first intermediate location;

withdrawing from the top of the first distillation column a first product stream rich in a component having a highest volatility of the at least three components;

withdrawing from the bottom of the first distillation column a second product stream rich in a component having a lowest volatility of the at least three components;

withdrawing from the first distillation column a mixture stream rich in at least one of the at least three components having an intermediate volatility and being lean in another component having a highest or lowest volatility of the at least three components;

feeding the mixture stream to the second distillation column;

withdrawing from the top of the second distillation column a third product stream rich in one of the at least three components; and withdrawing from the bottom of the second distillation column a fourth product stream rich in another of the at least three components.

19. A process as in claim 18 wherein the first and second distillation columns are thermally linked by condensing at least a portion of a vapor stream from the top of the first distillation column by heat exchange against at least a portion of a bottoms liquid from the bottom of the second distillation column.

20. A process as in claim 18 wherein the mixture stream is withdrawn from the first distillation column at a location below the first intermediate location and at least one separation stage above the bottom of the first distillation column.

21. A process as in claim 18 wherein the mixture stream is withdrawn from the first distillation column at a location above the first intermediate location and at least one separation stage below the top of the first distillation column.

22. A process as in claim 18 comprising the further step of reducing the pressure of the mixture stream withdrawn from the first distillation column before the mixture stream is fed to the second distillation column.

23. A process as in claim 22 wherein the mixture stream is withdrawn from the first distillation column as a liquid.

24. A process as in claim 22 wherein the mixture stream is withdrawn from the first distillation column as a vapor.

25. A process as in claim 23 wherein a product stream rich in one of the components having an intermediate volatility is withdrawn from the top of the second distillation column and a product stream rich in a component having a lowest volatility is withdrawn from the bottom of the second distillation column.

26. A process as in claim 18 wherein a mixture stream lean in a component having a lowest volatility is withdrawn from a location above the first intermediate location and at least one separation stage below the top of the first distillation column.

27. A process as in claim 18 comprising the further step of increasing the pressure of the mixture stream withdrawn from the first distillation column before the mixture stream is fed to the second distillation column.

28. A process as in claim 27 wherein the mixture stream is withdrawn from the first distillation column as a liquid.

29. A process as in claim 27 wherein the mixture stream is withdrawn from the first distillation column as a vapor.

30. A process as in claim 28 wherein a product stream rich in a component having an intermediate volatility is collected from the bottom of the second distillation column and a product stream rich in a component having a highest volatility is withdrawn from the top of the second distillation column.

31. A process as in claim 18 wherein a mixture stream lean in a component having a highest volatility is withdrawn from the first distillation column at a location below the first intermediate location and at least one separation stage above the bottom of the first distillation column.

32. A process as in claim 31 comprising the further step of increasing the pressure of the mixture stream withdrawn from the first distillation column before the mixture stream is fed to the second distillation column.

33. A process as in claim 32 wherein the mixture stream is withdrawn from the first distillation column as a liquid.

34. A process as in claim 32 wherein the mixture stream is withdrawn from the first distillation column as a vapor.

35. A process as in claim 33 wherein a product stream rich in a component having an intermediate volatility is withdrawn from the top of the second distillation column and a product stream rich in a component having the lowest volatility is withdrawn from the bottom of the second distillation column.

36. A cryogenic air separation unit using a process as in claim 18.

37. A process as in claim 18 wherein the multicomponent fluid is selected from the group consisting of nitrogen/oxygen/argon mixtures, benzene/toluene/xylene mixtures, nitrogen/carbon monoxide/methane mixtures, combinations of three or more components from C1 to C5 alcohols, and hydrocarbon mixtures, said hydrocarbon mixtures being selected from the group consisting of pentane-hexane-heptane, isopentane-pentane-hexane, butane-isopentane-pentane, iso-butane-n-butane-gasoline, and combinations of three or more components from C1 to C6 hydrocarbons or $C_4$ isomers.

38. A process as in claim 21 comprising the further step of reducing the pressure of the mixture stream withdrawn from the first distillation column before the mixture stream is fed to the second distillation column.

39. A process as in claim 38 wherein a product stream rich in a component having an intermediate volatility is collected from the bottom of the second distillation column and a product stream rich in a component having a highest volatility is withdrawn from the top of the second distillation column.

* * * * *